July 1, 1969
R. W. NOLAN
3,453,527
VOLTAGE REGULATORS FOR USE WITH GENERATORS
HAVING FIELD WINDINGS
Filed Aug. 17, 1966
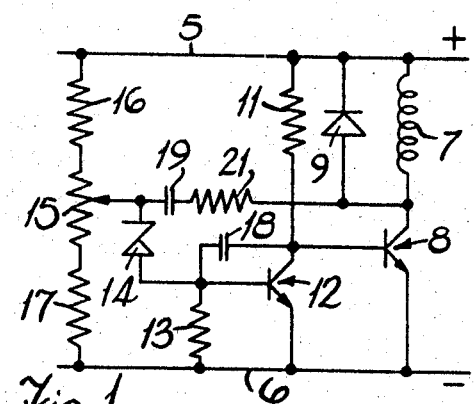
PRIOR ART  *Fig. 1.*
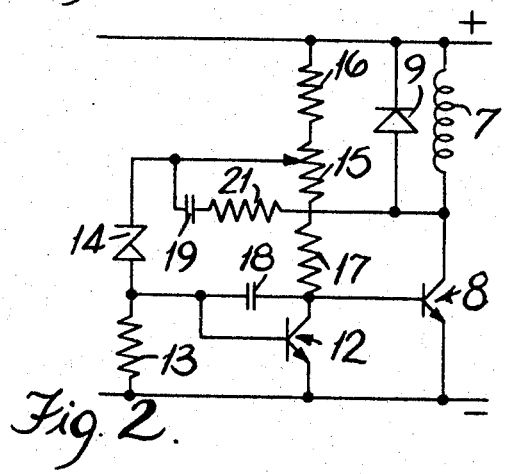
*Fig. 2.*

# United States Patent Office 3,453,527
Patented July 1, 1969

3,453,527
VOLTAGE REGULATORS FOR USE WITH GENERATORS HAVING FIELD WINDINGS
Roger William Nolan, Redditch, England, assignor to Joseph Lucas (Industries) Limited, Birmingham, England
Filed Aug. 17, 1966, Ser. No. 572,990
Claims priority, application Great Britain, Sept. 13, 1965, 38,964/65
Int. Cl. H02h 7/06, 9/14, 11/00
U.S. Cl. 322—28      1 Claim

ABSTRACT OF THE DISCLOSURE

A voltage regulator includes a first transistor having a field winding in its collector-emitter path and a second transistor which is controlled by a Zener diode, the second transistor when conducting removing base current from the first transistor, and a feedback network being provided to cause oscillations of the two transistors to regulate the field current. Instead of connecting the Zener diode to a resistance chain connected across the battery, as is usual, the resistance chain is in the collector circuit of the second transistor.

---

This invention relates to voltage regulators for use with generators having field windings.

A voltage regulator according to the invention comprises in combination a first transistor which in use has its emitter and collector connected in series with the field winding, a resistance chain in the base circuit of the first transistor, current flowing in use through the resistance chain to render the first transistor conductive, a second transistor having said resistance chain in its collector circuit, a voltage sensitive device connected to a point on said resistance chain, so as to be sensitive to the output voltage of the generator, means whereby conduction of said voltage sensitive device renders the second transistor conductive so as to reduce the base current flowing to the first transistor, and a feedback circuit between the collector of the first transistor and the base of the second transistor, the feedback circuit including a capacitor and ensuring that when the voltage sensitive device conducts, the first and second transistors will oscillate between a first state in which the second transistor conducts and the first transistor does not conduct, and a second state in which the first transistor conducts and the second transistor does not conduct.

In the accompanying drawings,

FIGURE 1 is a circuit diagram which does not form part of the present invention but is included by way of explanation, and FIGURE 2 illustrates an arrangement in accordance with one example of the present invention.

Referring to FIGURE 1, there are provided first and second lines 5, 6 the line 5 being connected in use to the positive terminal of a battery through a switch, and a negative terminal of the battery and the line 6 being earthed in use. The battery is charged by an alternator having a built-in full wave rectifier.

The line 5 is connected through a field winding 7 of the alternator to the collector of an n-p-n transistor 8 having its emitter connected to the lines 6. The winding 7 is bridged by a diode 9 for conducting back E.M.F. generated therein. The base of the transistor 8 is connected through a resistor 11 to the line 5, and is further connected to the collector of a transistor 12 having its emitter connected to the line 6. The base of the transistor 12 is connected to the line 6 through a resistor 13, and is also connected to the anode of the Zener diode 14 having its cathode connected to a variable point on a resistor 15 having its ends connected respectively to the lines 5, 6 through resistors 16, 17. Moreover, the base and collector of the transistor 12 are interconnected through a capacitor 18, and the cathode of the Zener diode 14 is connected to the collector of the transistor 8 through a capacitor 19 in series with a resistor 21.

When the speed of the alternator is low, the diode 14 does not conduct, and so no base current flows to the transistor 12. The current flowing through the resistor 11 flows through the base and emitter of the transistor 8, and so the transistor 8 conducts fully and the field winding 7 is energised.

When the voltage between the lines 5, 6 exceeds a predetermined value, the Zener diode 14 conducts and current flows through the base and emitter of the transistor 12. The transistor 12 now commences to conduct, and so the base of the transistor 8 become increasingly positive so that the current flowing in the winding 7 is reduced. In the absence of the feedback circuit through the capacitor 19 and resistor 21, the amplifier constituted by the transistors 12, 8 would assume a state in which the transistor 8 is off and the transistor 12 is on. However, by virtue of the feedback circuit through the capacitor 19 and resistor 21, the amplifier including the transistors 12, 8 is unstable, and so when the Zener diode 14 is conducting, the transistors 12, 8 oscillate between the two alternative states in one of which the transistor 12 conducts and the transistor 8 does not conduct, and in the other of which the transistor 8 conducts and the transistor 12 does not conduct. In this way, the risk of overheating of the transistor 8 is minimised. It will be appreciated that if the voltage between the lines 5, 6 varies when the diode 14 is conducting, the current flowing through the diode 14 will vary and so change the on-off period of the transistor 12, 8.

The battery voltage of which the Zener diode 14 conducts can be varied in accordance with temperature, for example by employing a thermistor (not shown) in association with the resistance chain 16, 15, 17.

The capacitor 18 is included to minimise radio interference. The capacitor 18 could be connected between the collector and base of the transistor 8, or alternatively a pair of capacitors could be used connected between the collectors and bases of the transistors 12, 8.

The resistor 13 is incorporated to prevent any possibility of leakage current through the Zener diode 14 rendering the transistor 12 conductive.

FIGURE 2 shows the circuit of FIGURE 1 modified to accord with one example of the present invention. It will be seen that the resistor 11 is omitted, and instead of connecting the lower end of the resistor 17 to the line 6, it is connected to the collector of the transistor 12 and to the base of the transistor 8. These modifications make no difference whatsoever to the operation of the circuit. Thus, when the battery voltage is below the predetermined value, the resistance chain is completed through the base and emitter of the transistor 8, and the Zener diode 14 conducts when the predetermined value is exceeded in the same way as before. The base voltage of the transistor 8 when it is conducting is sufficiently close to the voltage of the line 6 for the base-emitter voltage drop to be insignificant. Moreover, when the transistor 12 conducts, its collector voltage is close to the voltage of the line 6, and so the fact that the lower end of resistor 17 is not connected directly to the line 6 does not alter the operation in any way.

The arrangement described in FIGURE 2 has the advantage that the resistor 11 is no longer required, but in addition the far more important advantage that the heat dissipation in the voltage regulator is reduced considerably, a reduction of 50% being obtained in one case. This is because the circuit shown in FIGURE 2 completely avoids the unnecessary heat dissipated in the resistors 15, 16, 17 in FIGURE 1.

Having thus described my invention what I claim as new and desire to secure by Letters Patent is:

1. A voltage regulator for use with a generator having a field winding, comprising in combination a D.C. source, a first transistor, means connecting the emitter and collector of said first transistor in series with the field winding across said D.C. source, a resistance chain connecting the base of the first transistor to one terminal of said D.C. source, current flowing through the resistance chain to render the first transistor conductive, a second transistor having said resistance chain in its collector circuit, a voltage sensitive device connected to a point on said resistance chain, so as to be sensitive to the output voltage of the generator, means whereby conduction of said voltage sensitive device renders the second transistor conductive so as to reduce the base current flowing to the first transistor, and the feedback circuit between the collector of the first transistor and the base of the second transistor, the feedback circuit including a capacitor and ensuring that when the voltage sensitive device conducts, the first and second transistors will oscillate between a first state in which the second transistor conducts and the first transistor does not conduct, and a second state in which the first transistor conducts and the second transistor does not conduct.

References Cited

UNITED STATES PATENTS

| | | | |
|---|---|---|---|
| 3,253,210 | 5/1966 | Cummins | 322—28 |
| 3,263,155 | 7/1966 | Dietl | 322—28 |
| 3,332,003 | 7/1967 | Hetzler | 322—28 |
| 3,361,915 | 1/1968 | Baker | 322—28 X |

ORIS L. RADER, *Primary Examiner.*

H. HUBERFIELD, *Assistant Examiner.*

U.S. Cl. X.R.

322—70, 73